United States Patent [19]
Kempter et al.

[11] Patent Number: 6,162,261
[45] Date of Patent: *Dec. 19, 2000

[54] TRIPHENDIOXAZINE

[75] Inventors: Peter Kempter, Lörrach, Germany; Bansi Lal Kaul, Biel-Benken, Switzerland

[73] Assignee: Clariant Finance (BVI) Limited, Tortola, Virgin Islands (Br.)

[*] Notice: This patent issued on a continued prosecution application filed under 37 CFR 1.53(d), and is subject to the twenty year patent term provisions of 35 U.S.C. 154(a)(2).

[21] Appl. No.: 09/103,946

[22] Filed: Jun. 24, 1998

[30] Foreign Application Priority Data

Jun. 25, 1997 [DE] Germany ............ 197 27 079

[51] Int. Cl.$^7$ ............ C07D 498/14; C07D 498/22

[52] U.S. Cl. ............ 8/506; 544/74

[58] Field of Search .............. 544/74; 8/506

[56] References Cited

U.S. PATENT DOCUMENTS

| | | | |
|---|---|---|---|
| 4,751,300 | 6/1988 | Fujita et al. | 544/74 |
| 4,876,342 | 10/1989 | Pedrazzi et al. | 544/14 |
| 5,565,563 | 10/1996 | Kaul et al. | 544/74 |

*Primary Examiner*—Mukund J. Shah
*Assistant Examiner*—Hong Liu
*Attorney, Agent, or Firm*—Susan S. Jackson; Scott E. Hanf

[57] ABSTRACT

The invention relates to triphendioxazine compounds of the formula (I)

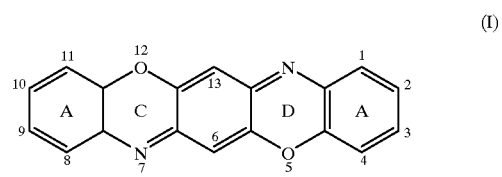

where the rings marked with A comprise, independently of one another, rings which are fused linearly in positions 2,3 and 9,10 or angularly in positions 1,2 and 8,9 or 3,4 and 10,11 and have the radical members of the formula (i) —$NR_1(CO)_m$—NH—, (ii) —$CR_1$=CH—CO—NH—, (iii) —O—$CH_2$—CO—NH—, (iv) —CO—CH=$CR_1$—NH—, (v) —CO—NH—CO—NH—, (vi) —CO—NH—$CR_2$=N—, (vii) —$CR_2$=N—CO—NH—, (viii) —$NR_1$—$(CO)_m$—O—, (ix) —NH—$CR_1$=N—, (x) —NH—CO—$CR_1$=N—, (xi) —NH—CO—$CHR_1$—NH—, (xii) —$NR_3$—$(CO)_m$—$NR_4$—, (xiii) —$NR_5$—$(CO)_m$—$NR_6$—, (xiv) —$NR_4$—CO—O— or (xv) —$NR_6$—CO—O—, m is 1 or 2, $R_1$ is hydrogen, $C_{1-4}$alkyl or phenyl, preferably hydrogen, methyl or ethyl, $R_2$ is hydrogen, $C_{1-4}$alkyl or phenyl, preferably hydrogen, methyl or ethyl, $R_3$, $R_4$, $R_5$ and $R_6$ independently of one another are hydrogen, a $C_{1-8}$alkyl radical, a substituted or unsubstituted phenyl, benzyl, naphthyl or benzanilide radical, a substituted or unsubstituted $C_{5-6}$cycloalkyl radical or a radical of the formula

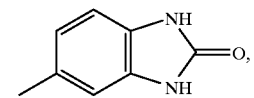

and the angular molecules in positions 3 and 10 and/or positions 2 and 9 can each carry a $C_{1-2}$alkoxy group, to the process for their preparation and to their use as pigments having high migration and solvent fastness.

13 Claims, No Drawings

TRIPHENDIOXAZINE

The invention relates to chlorine-free, symmetrically or asymmetrically substituted triphendioxazine compounds of the formula (I) below and to their use as pigments, especially for the colouring of polymer compositions. The invention also relates to a process for preparing these triphendioxazine compounds.

The dichlorinated triphendioxazine compounds are disclosed in the co-pending patent application DE 44 42 291.1.

It has now been found that the chlorine-free triphendioxazine compounds are obtained if the condensation reaction is conducted in the presence of organic carboxylic acids.

The invention therefore provides triphendioxazine compounds of the formula (I)

(I)

where the rings marked with A comprise, independently of one another, rings which are fused linearly in positions 2,3 and 9,10 or angularly in positions 1,2 and 8,9 or 3,4 and 10,11 and have the radical members of the formula (i) —$NR_1(CO)_m$—NH—, (ii) —$CR_1$=CH—CO—NH—, (iii) —$CH_2$—CO—NH—, (iv) —CO—CH=$CR_1$—NH—, (v) —CO—NH—CO—NH—, (vi) —CO—NH—$CR_2$=N—, (vii) —$CR_2$=N—CO—NH—, (viii) —$NR_1$—(CO)$_m$—O—, (ix) —NH—$CR_1$=N—, (x) —NH—CO—$CR_1$=N—, (xi) —NH—CO—$CHR_1$—NH—, (xii) —$NR_3$—(CO)$_m$—$NR_4$—, (xiii) —$NR_5$—(CO)$_m$—$NR_6$—, (xiv) —$NR_4$—CO—O— or (xv) —$NR_6$—CO—O—, m is 1 or 2, $R_1$ is hydrogen, $C_{1-4}$alkyl or phenyl, preferably hydrogen, methyl or ethyl, $R_2$ is hydrogen, $C_{1-4}$alkyl or phenyl, preferably hydrogen, methyl or ethyl, $R_3$, $R_4$, $R_5$ and $R_6$ independently of one another are hydrogen, a $C_{1-8}$alkyl radical, a substituted or unsubstituted phenyl, benzyl, naphthyl or benzanilide radical, a substituted or unsubstituted $C_{5-6}$cycloalkyl radical or a radical of the formula

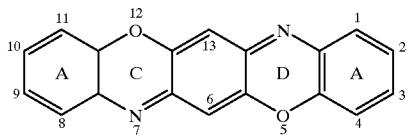

and the angular molecules in positions 3 and 10 and/or positions 2 and 9 can each carry a $C_{1-2}$alkoxy group.

In this connection it is surprising that even tetrasubstituted compounds possess pigmentary properties.

Preferably, $R_3$, $R_4$, $R_5$ and R6 independently of one another are hydrogen, a methyl radical, an ethyl radical, a propyl (n, i) radical, a butyl (n, i, sec, tert) radical, a cyclohexyl radical, a substituted or unsubstituted benzanilide radical, a naphthyl radical, a radical of the formula an unsubstituted phenyl radical, or a phenyl radical which is substituted one or more times by radicals selected from the group consisting of halogen, preferably chlorine, nitro groups, phenyl radicals, $C_{1-8}$-alkyl radicals, preferably $C_{1-4}$-alkyl radicals, and $C_{1-2}$-alkoxy radicals.

The abovementioned substituted phenyl radical in the definition of $R_3$ to $R_6$ is preferably selected from the group consisting of radicals of the formulae (a) to (q).

(a)

o,m,p (b)

o,m,p (c)

o,m,p (d)

(e)

-continued
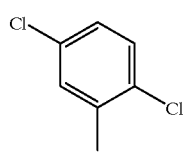 (f)
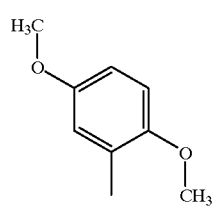 (g)
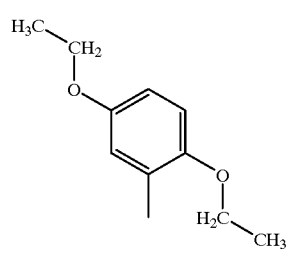 (h)
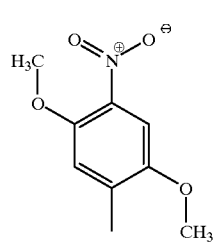 (i)
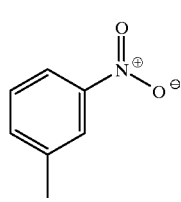 (j)
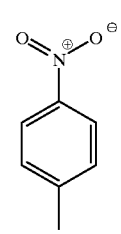 (k)
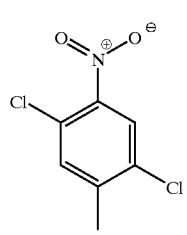 (l)
-continued
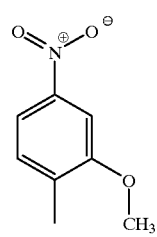 (m)
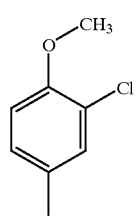 (n)
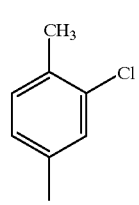 (o)
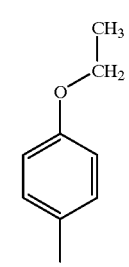 (p)
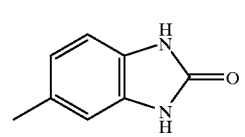 (q)
The abovementioned substituted benzanilide radical in the definition of $R_3$ to $R_6$ is preferably selected from the group consisting of radicals of the formulae (r) and (s).
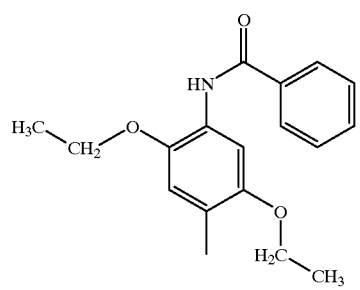 (r)

(s)

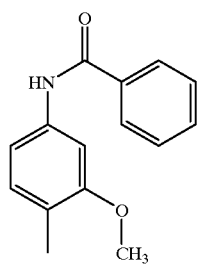

Among the triphendioxazine compounds which contain the radical members of the formulae (xii) to (xv) preference is given to those for which $R_4$ and $R_6$ are hydrogen and $R_3$ is a methyl radical and $R_5$ is an ethyl radical (asymetrically disubstituted compound) or $R_3$ and $R_5$ are each a 4-methylphenyl or 4-methoxyphenyl radical (symmetrically disubstituted compounds).

Among the symmetrically tetrasubstituted compounds, the tetramethyl-, tetraethyl-, tetrapropyl(n, i)- and tetrabutyl (n, i, sec, tert)-substituted compounds are preferred.

Of the asymmetrically tetrasubstituted compounds, preference is given to those for which the definitions of $R_3$ and $R_4$ are selected from the group consisting of the radicals methyl, ethyl, propyl (n, i) and butyl (n, i, sec, tert) and $R_5$ and $R_6$ can have any of the abovementioned definitions.

In preferred pigments of the formula (I) with radical members of the formulae (i) to (xi), the formula components

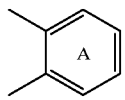

are preferably of the formulae (α) to (ρ)

(α)

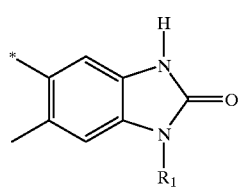

(β)

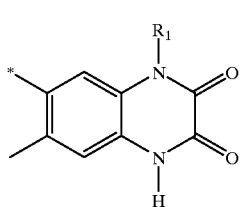

(γ)

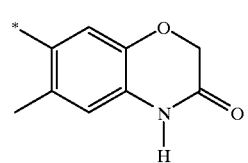

(δ)

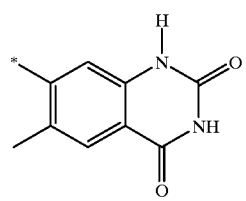

(ε)

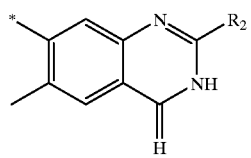

(ζ)

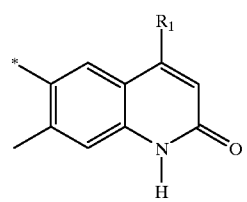

(η)

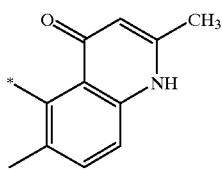

(θ)

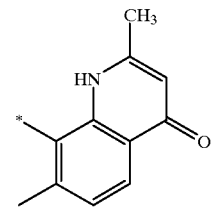

(ι)

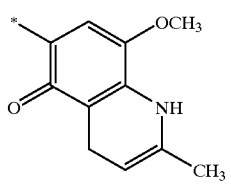

(κ)

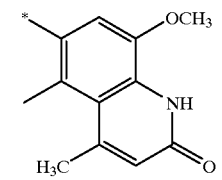

-continued

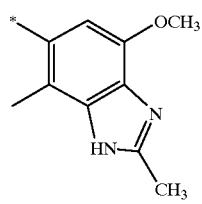
(λ)

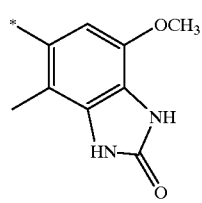
(μ)

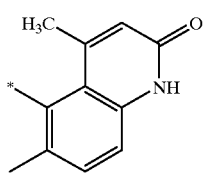
(ν)

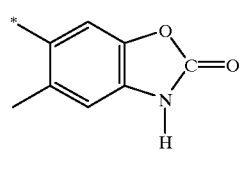
(ξ)

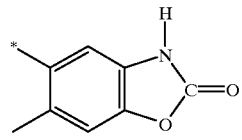
(ο)

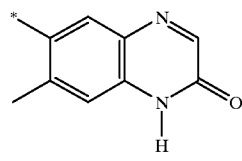
(π)

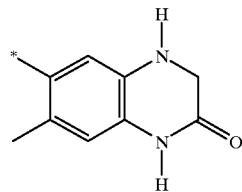
(ρ)

where the bond labelled * leads to the nitrogen atom and
R$_1$ is hydrogen, C$_{1-4}$alkyl or phenyl, preferably hydrogen, methyl or ethyl, and
R$_2$ is hydrogen, C$_{1-4}$alkyl or phenyl, preferably hydrogen, methyl or ethyl.

Particularly preferred compounds of the formula (I) with radical members of the formulae (i) to (xi) are those in which both rings A correspond to the formula components (α) or (ι).

The preparation of compounds of the invention is characterized in that 1 mol of 2,3,5,6-tetrachloro-1,4-benzoquinone is condensed with 2 mol of a compound of the formula (IIa) and (IIb)

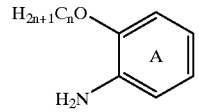
(IIa)

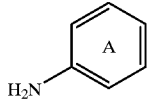
(IIb)

in which n is 1, 2 or 3
in the presence of an organic carboxylic acid, especially para-toluenesulphonic acid. If the heterocycles fused to the rings A are different, it is necessary to employ different compounds of the formula (IIa) and (IIb) and to take measures for an asymmetric condensation. The condensation reaction is conducted in an inert solvent, preferably ortho-dichlorobenzene.

The compounds of the formula (IIa) and (IIb) are known (see e.g. DE-A 28 55 883) or can be prepared without difficulties in analogy to known and described methods or by another method familiar to the man skilled in the art.

The man skilled in the art is aware that the condensation reaction does not in general lead completely to the chlorine-free compounds of the formula (I) of the invention; in addition to such compounds there is virtually always formation of a certain amount of monochloro and dichloro compound. The greater the amount of organic carboxylic acid present as condensing agent in the reaction mixture, the purer the end product.

Since the separation of the chlorine-free triphendioxazine compounds is extremely difficult and the advantageous properties also apply in a mixture with the mono- and dichlorinated compounds, the mixture which is produced is used as the pigment, preferably following customary aftertreatment.

By means of the abovementioned aftertreatment of the crude pigments in organic solvents in which the pigments themselves are not dissolved and at elevated temperatures, for example at from 60 to 200° C., in particular from 70 to 150° C. and, preferably, from 75 to 100° C., it is often possible to improve the pigment properties further. The aftertreatment is preferably combined with a milling or kneading operation.

The pigments of the invention are outstandingly suitable for colouring polymer compositions, by which are meant solvent-free and solvent-containing compositions comprising plastics or synthetic resins (in oil-based or water-based paints, in paints of various kinds, for spin dyeing of viscose or cellulose acetate or for pigmenting polymers, such as polyamide, polyethylene, polystyrene, polyvinyl chloride, rubber and artificial leather). They can also be used in printing inks for the graphical industry, for the colouring of paper pulp, for the coating of textiles or for pigment printing.

The resulting colourations are notable for their outstanding heat, light and weather fastness, chemical resistance, colour strength and very good applications properties, e.g. crystallization fastness and dispersing fastness, and especially for their fastness to migration, bleeding, overcoating and solvents.

In addition, the pigments of the invention are also suitable as colorants in electrophotographic toners and developers, such as one- or two-component powder toners (also known as one- or two-component developers), magnetic toners, liquid toners, polymerization toners and further special toners (lit.: L. B. Schein, "Electrophotography and Development Physics"; Springer Series in Electrophysics 14, Springer Verlag, 2nd edition, 1992).

Typical toner binders are polymerization, polyaddition and polycondensation resins, such as styrene, styrene-acrylate, styrene-butadiene, acrylate, polyester, phenolic and epoxy resins, polysulphones, polyurethanes, individually or in combination, and also polyethylene and polypropylene, in or to which further ingredients, such as charge control agents, waxes or flow auxiliaries, may be present or added subsequently.

A further application area of pigments of the invention is their use as colorants in powders and powder coating materials, especially triboelectrically or electrokinetically sprayed powder coating materials, which are used to coat the surfaces of articles made, for example, from metal, wood, plastic, glass, ceramic, concrete, textile material, paper or rubber (J. F. Hughes, "Electrostatics Powder Coating", Research Studies Press, John Wiley & Sons, 1984).

Powder coating resins employed are typically epoxy resins, carboxyl- and hydroxyl-containing polyester resins, polyurethane resins and acrylic resins together with customary curing agents. Combinations of resins are also used. For example, epoxy resins are frequently employed in combination with carboxyl- and hydroxyl-containing polyester resins. Examples of typical curing components (depending on the resin system) are acid anhydrides, imidazoles and dicyandiamide and derivatives thereof, blocked isocyanates, bisacylurethanes, phenolic and melamin resins, triglycidyl isocyanurates, oxazolines and dicarboxylic acids.

The pigments of the invention are suitable, moreover, as colorants in inkjet inks, both aqueous and non-aqueous, and in those inks which operate by the hot-melt process.

In the following examples the parts and percentages are by weight. The temperatures are indicated in degrees Celsius. One part by volume corresponds to the volume of one part by weight of water.

EXAMPLE 1

24 parts of 4-methyl-5,8-dimethoxy-6-aminoquinol-2-one, 12 parts of chloranil (2,3,5,6-tetrachlorobenzoquinone) and 8.5 parts of anhydrous sodium acetate are introduced into 300 parts by volume of o-dichlorobenzene. The mixture is heated at 70° C. with stirring for 6 hours and then a mixture of acetic acid and o-dichlorobenzene is distilled off at between 80 and 130°. After the end of distillation, 12 parts of p-toluenesulphonic acid are introduced and the temperature is raised to 175–180° for 8 hours, the o-dichlorobenzene lost by distillation being replaced. The mixture is allowed to cool to 100° and then is filtered, and the residue is washed first with hot o-dichlorobenzene, then with ethanol, then with hot water and finally with cold water and is dried. This gives the pigment of the formula

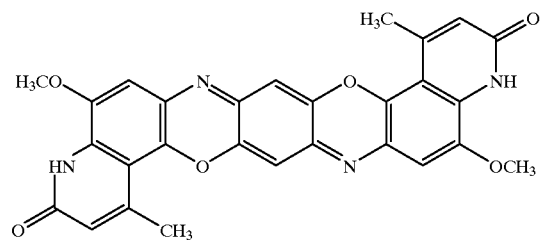

which colours plastics in reddish-blue shades with excellent migration and solvent fastness.

AFTERTREATMENT 10 parts of the pigment prepared according to Example 1 are milled in a ball mill with a capacity of 0.5 litre using 1 kg of steel balls of 4 mm in diameter in the presence of 30 parts of NaCl and 150 parts of acetone for 72 hours. The millbase obtained is screened to remove the balls, filtered and washed free of salt with 2000 parts of water. The pigment is dried in vacuo at 80°.

The instructions in Example 1 are followed analogously to prepare the pigments of the formula (I), in which the rings A correspond to the following formulae (a) to (o).

TABLE 1

| Example | Ring A |
| --- | --- |
| 2 | a |
| 3 | b |
| 4 | c |
| 5 | d |
| 6 | e |
| 7 | f |
| 8 | g |
| 9 | h |
| 10 | i |
| 11 | j |
| 12 | k |
| 13 | l |
| 14 | m |
| 15 | n |
| 16 | o | groups (a) to (o) are as follows:

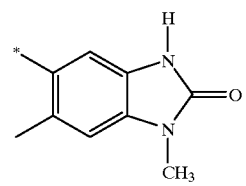

(a)

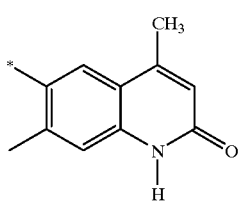

(b)

-continued
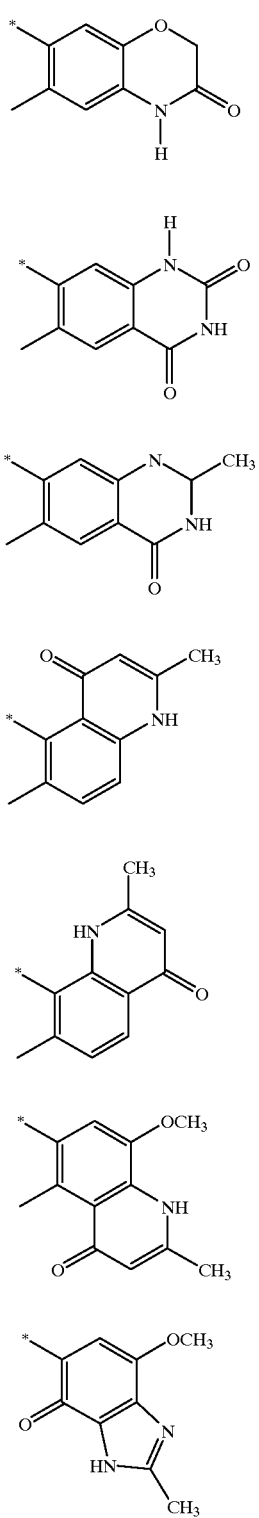
(c)
(d)
(e)
(f)
(g)
(h)
(i)
-continued
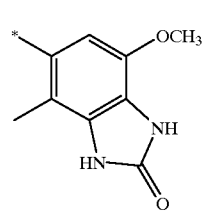 (j)
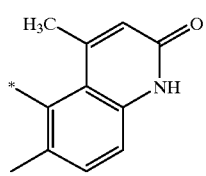 (k)
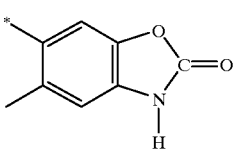 (l)
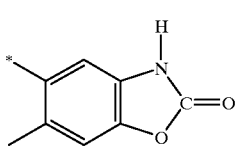 (m)
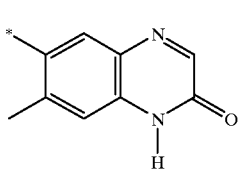 (n)
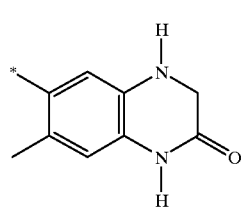 (o)

EXAMPLE 17

Diimidazolono(4,5-b:4',5'-m)triphendioxazine-3,11-di-p-tolyl-2,10-dione

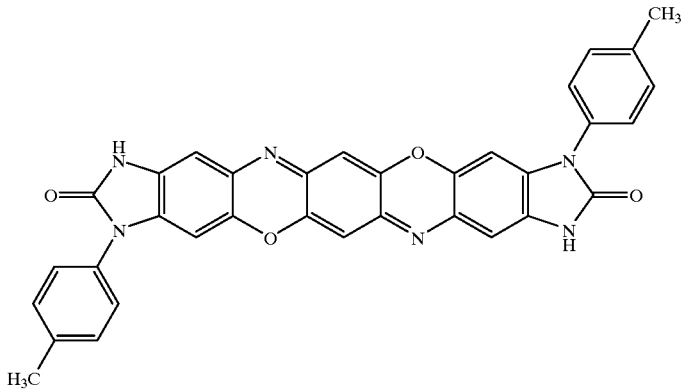

23.9 parts of 1-phenyl-1,3-dihydro-5-aminobenzimidazol-2-one, 12 parts of chloranil (2,3,5,6-tetrachlorobenzoquinone) and 8.5 parts of anhydrous sodium acetate are introduced into 300 parts by volume of o-dichlorobenzene. The mixture is heated at 70° C. with stirring for 6 hours and then a mixture of acetic acid and o-dichlorobenzene is distilled off at between 80° C. and 130° C. After the end of distillation, 12 parts of p-toluenesulphonic acid are introduced and the temperature is raised to 175–180° C. for 8 hours, the o-dichlorobenzene lost by distillation being replaced. The mixture is allowed to cool to 100° C. and then is filtered, and the residue is washed first with hot o-dichlorobenzene, then with ethanol, then with hot water and finally with cold water and is dried. This gives 25 parts of a pigment of the above formula which colours plastics in reddish-violet shades with excellent migration fastness.

EXAMPLE 18

Diimidazolono(4,5-b:4',5'-m)triphendioxazine-3,11-di-p-methoxyphenyl-2,10-dione

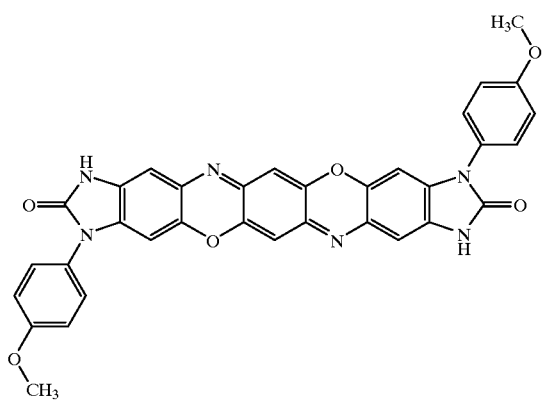

25.5 parts of 1-(4-methoxyphenyl)-1,3-dihydro-5-aminobenzimidazol-2-one, 12 parts of chloranil (2,3,5,6-tetrachlorobenzoquinone) and 8.5 parts of anhydrous sodium acetate are introduced into 300 parts by volume of o-dichlorobenzene. The mixture is heated at 70° C. with stirring for 6 hours and then a mixture of acetic acid and o-dichlorobenzene is distilled off at between 80° C. and 130° C. After the end of distillation, 12 parts of p-toluenesulphonic acid are introduced and the temperature is raised to 175–180° C. for 8 hours, the o-dichlorobenzene lost by distillation being replaced. The mixture is allowed to cool to 100° C. and then is filtered, and the residue is washed first with hot o-dichlorobenzene, then with ethanol, then with hot water and finally with cold water and is dried. This gives 26 parts of a pigment of the above formula which colours plastics in reddish-violet shades with excellent migration fastness.

EXAMPLE 19

Diimidazolono(4,5-b:4',5'-m)triphendioxazine-2,10-dione

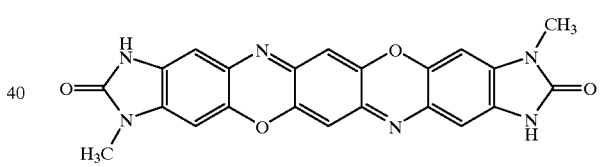

16.3 parts of 5-aminobenzimidazolon-2-one, 12 parts of chloranil (2,3,5,6-tetrachlorobenzoquinone) and 8.5 parts of anhydrous sodium acetate are introduced into 300 parts by volume of o-dichlorobenzene. The mixture is heated at 70° C. with stirring for 6 hours and then a mixture of acetic acid and o-dichlorobenzene is distilled off at between 80° C. and 130° C. After the end of distillation, 12 parts of p-toluenesulphonic acid are introduced and the temperature is raised to 175–180° C. for 8 hours, the o-dichlorobenzene lost by stillation being replaced. The mixture is allowed to cool to 100° C. and then is filtered, and the residue is washed first with hot o-dichlorobenzene, then with ethanol, then with hot water and finally with cold water and is dried. The resulting pigment of the above formula colours plastics in reddish-violet shades with excellent migration and solvent fastness.

USE EXAMPLE 1

4 parts of the pigment according to Example 1 are milled with 96 parts of a mixture of 50 parts of a 60% strength solution of coconut-aldehyde-melamin resin solution in butanol, 10 parts of xylene and 10 parts of ethylene glycol monoethyl ether for 24 hours in a ball mill. The resulting dispersion is sprayed onto sheet aluminium, allowed to dry in air for 30 minutes and then stoved at 120° for 30 minutes.

The result is a bright reddish-violet film having very good migration fastness and also good light and weathering stability.

USE EXAMPLE 2

Example of the preparation of a 0.1% coloured PVC film (extender ratio colour pigment to white pigment=1:5):

16.5 parts of a plasticizer mixture consisting of equal parts of dioctyl phthalate and dibutyl phthalate are mixed with 0.05 part of the pigment dye according to Example 1 and 0.25 part of titanium dioxide. Then 33.5 parts of polyvinyl chloride are added. The mixture is rolled with friction for 10 minutes on a double-roll mill, the resulting sheet being continually chopped with a spatula and rolled together. In the mill, one roll is held at a temperature of 40° and the other at a temperature of 140°. The mixture is subsequently taken off as a sheet and pressed at 160° for 5 minutes between two polished metal plates.

This gives a PVC film with a reddish-violet colouration of high brightness and very good migration and light fastness.

What is claimed is:

1. The triphendioxazine compounds of the formula (I)

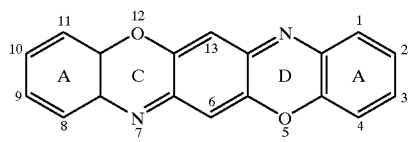

(I)

where the rings marked with A comprise, independently of one another, rings which are fused linearly in positions 2,3 and 9,10 or angularly in positions 1,2 and 8,9 or 3,4 and 10,11 and have the radical members of the formula (i) —NR$_1$(CO)$_m$—NH—, (ii) —CR$_1$=CH—CO—NH—, (iii) —O—CH$_2$—CO—NH—, (iv) —CO—CH=CR$_1$—NH—, (v) —CO—NH—CO—NH—, (vi) —CO—NH—CR$_2$=N—, (vii) —CR$_2$=N—CO—NH—, (viii) —NR$_1$—(CO)$_m$—O—, (ix) —NH—CR$_1$=N—, (x) —NH—CO—CR$_1$=N—, (xi) —NH—CO—CHR$_1$—NH—, (xii) —NR$_3$—(CO)$_m$—NR$_4$—, (xiii) —NR$_5$—(CO)$_m$—NR$_6$—, (xiv) —NR$_4$—CO—O— or (xv) —NR$_6$—CO—O—, m is 1 or 2, R$_1$ is hydrogen, C$_{1-4}$alkyl or phenyl, R$_2$ is hydrogen, C$_{1-4}$alkyl or phenyl, R$_3$, R$_4$, R$_5$ and R$_6$ independently of one another are hydrogen, a C$_{1-8}$alkyl radical, a substituted or unsubstituted phenyl, benzyl, naphthyl or benzanilide radical, a substituted or unsubstituted C$_{5-6}$cycloalkyl radical or a radical of the formula

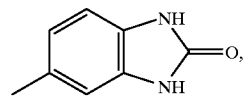

and the angular molecules in positions 3 and 10 and/or positions 2 and 9 can each carry a C$_{1-2}$alkoxy group.

2. Triphendioxazine compounds according to claim 1, where R$_3$, R$_4$, R$_5$ and R$_6$ independently of one another are hydrogen, a methyl radical, an ethyl radical, a propyl (n, i) radical, a butyl (n, i, sec, tert) radical, a cyclohexyl radical, a substituted or unsubstituted benzanilide radical, a naphthyl radical, a radical of the formula

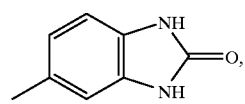

an unsubstituted phenyl radical, or a phenyl radical which is substituted one or more times by radicals selected from the group consisting of halogen, nitro groups, phenyl radicals, C$_{1-8}$alkyl radicals, and C$_{1-2}$alkoxy radicals.

3. The triphendioxazine compounds according to claim 2, wherein the radical is chlorine.

4. The triphendioxazine compounds according to claim 2, wherein the radical is a C$_{1-4}$alkyl radical.

5. Triphendioxazine compounds according to claim 2, in which the substituted phenyl radical is selected from the group consisting of radicals of the formulae (a) to (q)

(a)

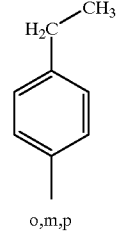

o,m,p (b)

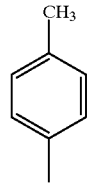

o,m,p (c)

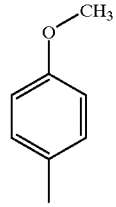

o,m,p (d) 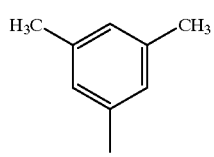
(e) 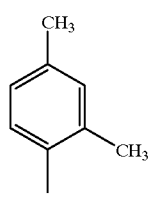
(f) 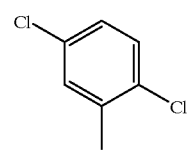
(g) 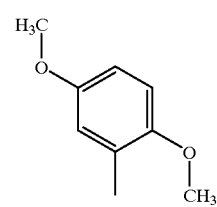
(h) 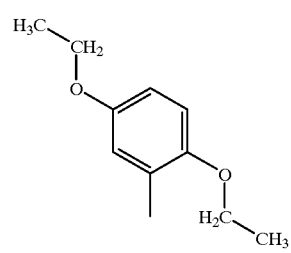
(i) 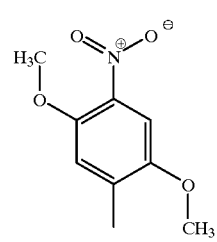
(j) 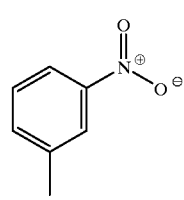
(k) 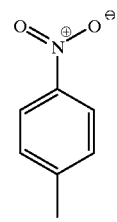
(l) 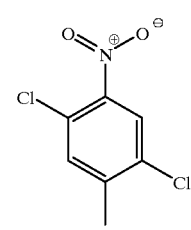
(m) 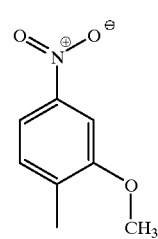
(n) 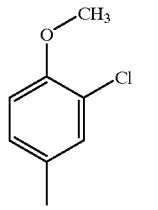
(o) 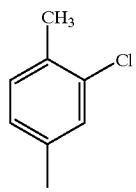
(p) 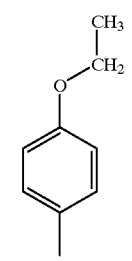
(q) 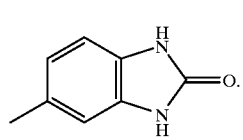

6. Triphendioxazine compounds according to claim 2, in which the substituted benzanilide radical is selected from the group consisting of radicals of the formulae (r) and (s)

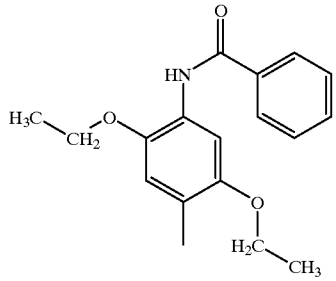

(r)

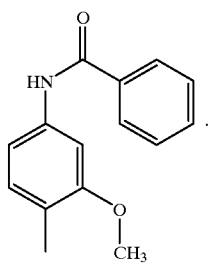

(s)

7. Triphendioxazine compound according to claim 1 of the formula III

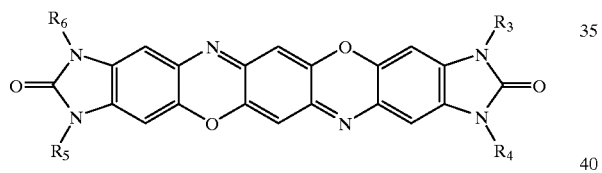

where $R_4$ and $R_6$ are hydrogen, $R_3$ is a methyl radical and $R_5$ is an ethyl radical.

8. Triphendioxazine compound of formula III according to claim 7 where $R_4$ and $R_6$ are hydrogen and $R_3$ and $R_5$ are each a radical of the formula

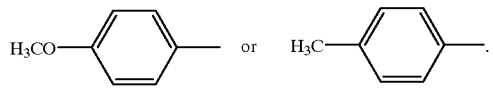

9. Triphendioxazine compounds according to claim 1, in which for the radical members of the formulae (i) to (xi) the formula components

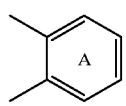

are of the formulae (α) to (ρ)

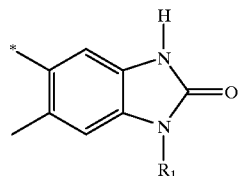

(α)

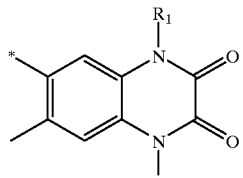

(β)

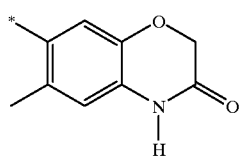

(γ)

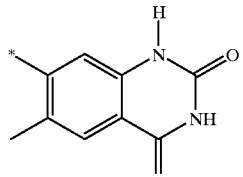

(δ)

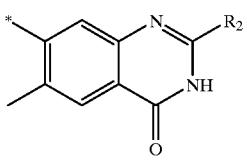

(ε)

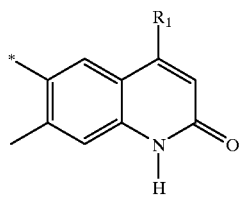

(ζ)

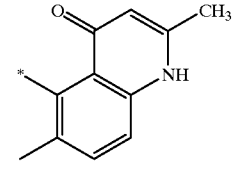

(η)

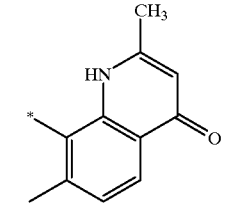

(θ)

-continued (ι) 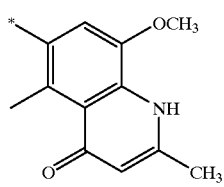

(κ) 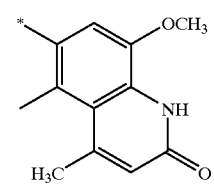

(λ) 

(μ) 

(ν) 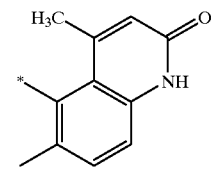

(ξ) 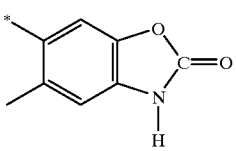

(ο) 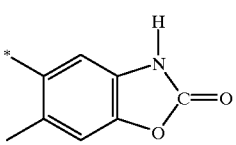

(π) 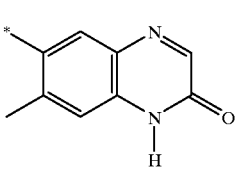

-continued (ρ) 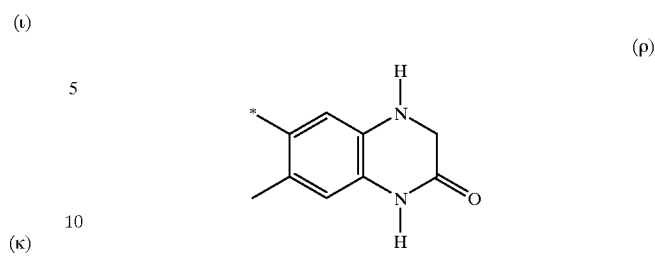

where the bond labelled * leads to the nitrogen atom and
R₁ is hydrogen, $C_{1-4}$alkyl or phenyl and
R₂ is hydrogen, $C_{1-4}$alkyl or phenyl.

10. Process for preparing the triphendioxazine compounds of the formula (I) according to claim 1, characterized in that 1 mol of 2,3,5,6-tetrachloro-1,4-benzoquinone is condensed with 2 mol of a compound of the formula (IIa) or (IIb)

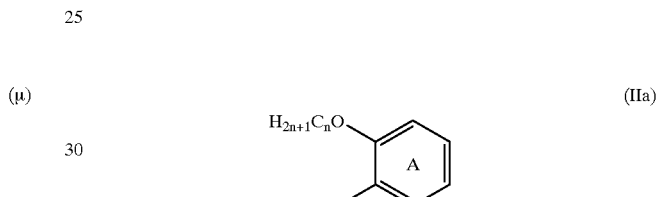

(IIa)

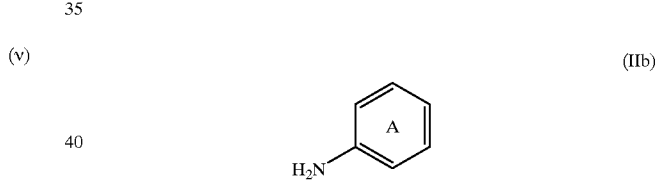

(IIb)

in which n is 1, 2 or 3 in the presence of an organic carboxylic acid.

11. The process according to claim 10, wherein the organic carboxylic acid is paratoluenesulphonic acid.

12. A pigment comprising at least one of the compounds of formula (I) according to claim 1.

13. A method of coloring a composition selected from the group of:

a polymer composition, a paper pulp, an electrophotographic toner, an electrophotographic developer, an inkjet ink, a paint, a varnish, a coating for textiles, a powder, a powder coating, and a printing ink;

comprising the step of adding the pigment of claim 12 to said composition.

* * * * *